United States Patent

[11] 3,615,298

[72] Inventor  Homer E. Benson
              Pittsburgh, Pa.
[21] Appl. No. 885,600
[22] Filed    Dec. 16, 1969
[45] Patented Oct. 26, 1971
[73] Assignee Consolidation Coal Company
              Continuation-in-part of application Ser. No.
              598,072, Nov. 30, 1966, now abandoned,
              Continuation of application Ser. No.
              816,000, Apr. 14, 1969, now Patent No.
              3,503,724.
              The portion of the term of the patent
              subsequent to Mar. 31, 1987, has been
              disclaimed.

[54] GASIFICATION OF CARBONACEOUS MATERIAL
     5 Claims, 1 Drawing Fig.
[52] U.S. Cl. .................................................. 48/197,
                                                  23/214, 48/202

[51] Int. Cl. .................................................. C01b 1/08,
                                                  C07c 9/04, C10j 3/46
[50] Field of Search .......................................... 48/197,
                             202, 210, 206; 23/214, 212, 212 A, 212 B;
                                                                252/373

[56]              References Cited
              UNITED STATES PATENTS
2,794,725  6/1957  Scharmann .................. 48/206
3,004,839  10/1961 Tornquist ..................... 48/197
3,503,724  3/1970  Benson ........................ 48/197 X Primary Examiner—Joseph Scovronek
Attorneys—D. Leigh Fowler, Jr. and Stanley J. Price, Jr.

ABSTRACT: The reaction of steam with iron, or lower iron oxides, is conducted in the presence of carbonaceous solids by circulating the steam upwardly in countercurrent flow relationship with downwardly moving iron or lower iron oxides in a fluidized bed of the carbonaceous solids.

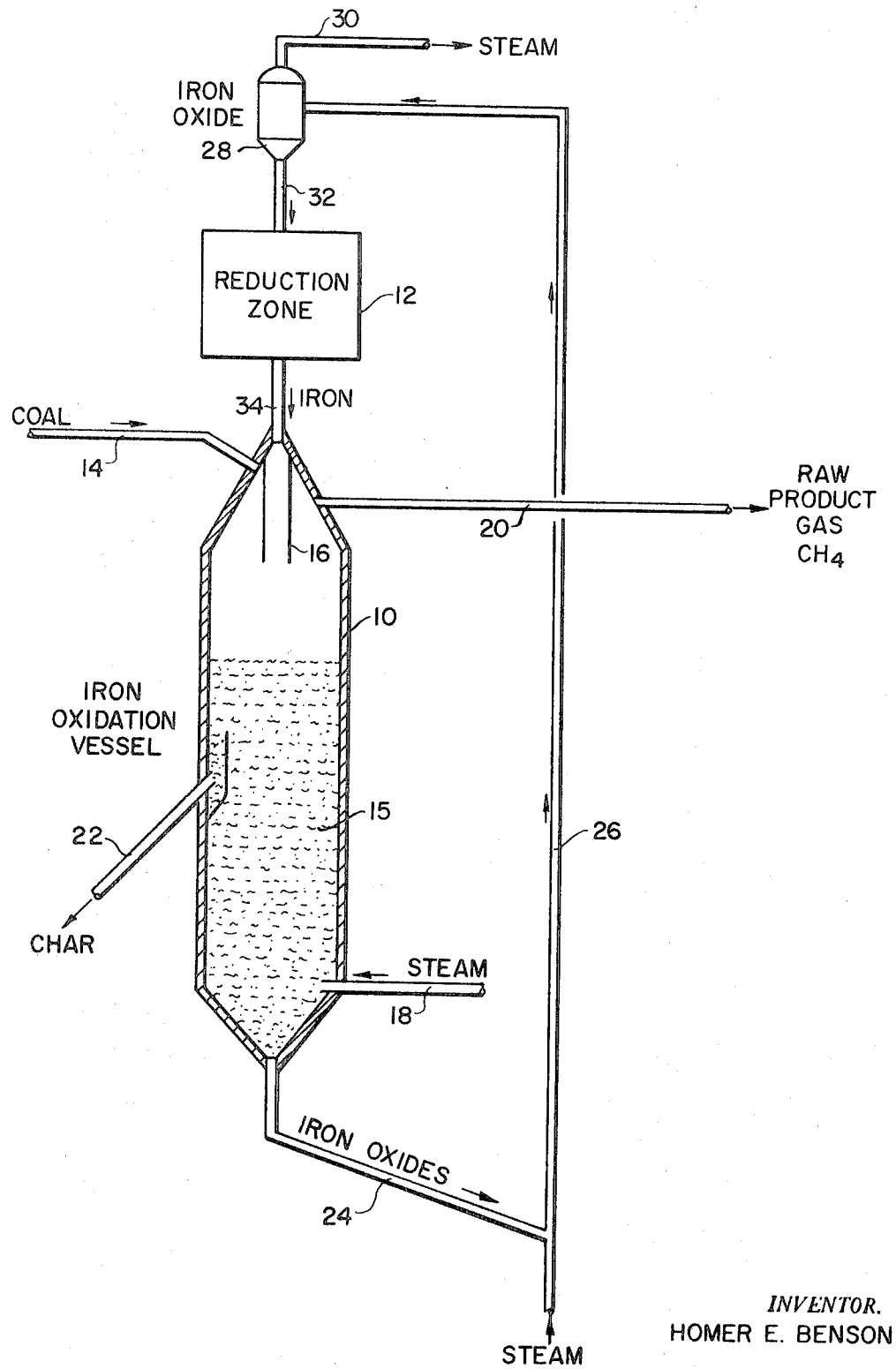

GASIFICATION OF CARBONACEOUS MATERIAL

CROSS-REFERENCE TO RELATED APPLICATIONS

This application is a continuation of application, Ser. No. 816,000, filed Apr. 14, 1969, entitled "Method and Apparatus for Producing Mixtures of Methane, Carbon Monoxide and Hydrogen," issued as Pat. No. 3,503,724 on March 31, 1970, and assigned to the assignee of the present application. Application Ser. No. 816,000 is a continuation Ser. No. 598,072, filed Nov. 30, 1966 (now abandoned).

BACKGROUND OF THE INVENTION

1. Field of the Invention

This invention relates to the production of mixtures of methane, carbon monoxide and hydrogen which are particularly suitable for the preparation of high B.t.u. gas from carbonaceous material such as coal, crude oil, residual oil or distillate fuels. The present invention is particularly useful for making high B.t.u. pipeline gas from coal; and therefore, it will be described with reference to coal although other carbonaceous materials can be used as feedstock.

2. Description of the Prior Art

In U.S. Pat. No. 3,222,147, I described a process for the preparation of mixtures of hydrogen, carbon monoxide and methane in which the steam-iron process is used to make hydrogen by reacting metallic iron and lower oxides of iron with steam in one reaction vessel to produce a mixture of hydrogen and steam, which mixture is then reacted in a second reaction vessel with coal char to make a mixture of hydrogen, carbon monoxide and methane. The reaction in the first vessel is the oxidation of metallic iron to produce higher metal oxides. These higher metal oxides are reacted in a third reaction vessel with a reducing gas containing hydrogen and carbon monoxide to reduce the higher metal oxides to lower oxides and metallic iron for reuse in the first reaction vessel. The reducing gas is produced in a fourth reactor in which coal char, steam and air are reacted to make a producer gas containing carbon monoxide and hydrogen.

In the above-cited application Ser. No. 816,000, I described a process wherein the iron oxidation and coal hydrogasification steps are carried out in one reaction vessel, and the steps of generating producer gas and reducing iron oxide are carried out in a second reaction vessel. Such an arrangement has a number of advantages over the four-reaction vessel system described in the above-mentioned U.S. Pat. No. 3,222,147. There are fewer vessels and, hence, less transfer of solids and gases. Raw coal that is difficult to use because of its agglomerating characteristics during hydrogasification can be used if it is mixed with iron or iron oxides. Therefore, it is not necessary to pretreat the raw coal prior to the hydrogasification step, and methane and hydrogen normally lost in pretreatment of coal become part of the product gases.

The conducting of the iron oxidation and the coal hydrogasification steps in one reaction vessel has other advantages. The oxidation of metallic iron and FeO with steam is exothermic, and the heat developed by the reaction is used to support the endothermic steam-carbon reaction which also makes additional hydrogen and carbon monoxide. The hydrogenation of char to form methane is also highly exothermic and supplies heat for the steam-carbon reaction. Therefore, the addition of coal to the reaction vessel in which FeO and metallic iron are oxidized increases the efficiency of the overall process.

SUMMARY OF THE INVENTION

In accordance with the present invention, a process for the gasification of carbonaceous material is provided which comprises circulating steam upwardly in countercurrent flow relationship with a downwardly moving particulate stream of iron and lower oxides of iron in a zone of fluidized carbonaceous solids at a temperature between 1,000° and 2,000° F. and a pressure between 200 and 2,000 p.s.i.g. The process of the present invention is based upon recognition of the different rates of reaction between the two principal reactions involved, namely, the reaction of steam with iron/lower oxides of iron, a very rapid reaction, and the reaction of hydrogen with carbon, a much slower reaction. My process takes advantage of the difference in densities of the carbonaceous solids and the iron solids. The latter pass rapidly downwardly though the zone of fluidized carbon without being fluidized and yet for a sufficient residence time to permit reaction with the upflowing steam. At the same time, the residence time of the carbonaceous solids may be independently regulated to permit efficient reaction with the upflowing gases, namely hydrogen and steam.

DESCRIPTION OF THE DRAWING

In the accompanying drawing, I have illustrated, partly in vertical section and partly schematically, a presently preferred embodiment of my invention for gasification of carbonaceous material.

DESCRIPTION OF PREFERRED EMBODIMENT

Referring to the drawing, the system comprises an Iron Oxidation Vessel 10 and a Reduction Zone 12. Raw coal is supplied to the upper portion of the Oxidation Vessel 10 through a pipe 14 and flows downwardly around a conduit 16 into the reaction zone below the conduit to form a bed of solids 15. Reduced iron oxides, including generally some metallic iron, flow downwardly through conduit 16 form the Reduction Zone 12. While passing downwardly around conduit 16, the raw coal is subjected to hot gases which (as hereinafter explained) flow upwardly in the upper portion of Oxidation Vessel 10. The hot gases hydrocrack tars present in the raw coal into methane which becomes part of the product gases.

Steam is introduced into the bottom of the oxidation Vessel through a conduit 18 and flows upwardly through the Oxidation Vessel in countercurrent flow relationship with the downflowing reduced iron oxides. The velocity of the steam is regulated in conventional fashion to maintain the bed 15 of devolatilized coal (i.e. char) in a dense phase fluidized state having a level below the lower end of conduit 16. The velocity of the steam and product gases is insufficient to effect fluidization of the more dense reduced iron oxides which fall freely down through the fluidized bed of char.

The following reactions take place in the Iron Oxidation Vessel 10:

| Reactions in Oxidation Vessel | H Calories (1472° F.) |
|---|---|
| 1. $H_2O + Fe \rightarrow FeO + H_2$ | −4,100 |
| 2. $H_2O + FeO \rightarrow Fe_3O_4 + H_2$ | −11,9000 |
| 3. $H_2O + C \rightarrow H_2 + CO$ | 32,400 |
| 4. $2H_2 + C \rightarrow CH_4$ | −21,800 |
| 5. $Coal \rightarrow CH_4 + Char$ | |

At the bottom of the Vessel 10, steam reacts with metallic iron and reduced iron oxide in accordance with reactions 1 and 2, respectively. These reactions are exothermic. The hydrogen produced and unreacted steam, as a mixture, pass upwardly through the reactor and the steam reacts with the char to make additional hydrogen and carbon monoxide according to reaction (3). At the top of the Vessel 10, in the fluidized bed itself, as well as above the bed, the hydrogen produced in the lower portion of the vessel reacts with fresh coal and char to make methane according to reaction (4). Methane is also produced by the pyrolysis of fresh coal according to reaction (5).

Hydrogen, carbon monoxide and methane flow from the top of the Iron Oxidation Vessel through a pipe 20 to a conventional purification system to convert the raw methane gas to a high B.t.u. pipeline gas.

The higher oxides of iron and char (some char may be separately withdrawn through a pipe 22, if desired) are withdrawn from the bottom of the Iron Oxidation Vessel 10 through a pipe 24 and are conveyed by a steam lift 26 to a cyclone separator 28 positioned above the Reduction Zone 12. The lift steam flows out of the pipe 30. The iron oxides and char pass from the separator 28 to the Reduction Zone 13 through a pipe 32.

The iron oxides are reduced in the Reduction Zone in any suitable conventional fashion. The reduction may be effected according to the method described in the aforementioned Ser. No. 816,000, or it may be accomplished simply by use of producer gas. The particular method forms no part of the present invention. The reduced iron oxides and metallic iron from the Reduction Zone 12 are conducted through a pipe 34 to the top of the Oxidation Vessel to repeat the cycle. As shown in the drawing, the reduced iron oxides enter the top of the Oxidation Vessel 10. However, if desired, they may be introduced directly into the bed 15. The point of introduction of the reduced iron oxides into the fluidized bed of char affects the ratio of carbon oxides to methane produced in the fluidized bed; and thus provides a mean for controlling this ratio. The production of carbon oxides via the reaction of carbon with steam (steam-carbon reaction) is greatly reduced by increasing the hydrogen-to-steam ratio, whereas the production of methane via the reaction of carbon with hydrogen (carbon-hydrogen reaction) is favored by increasing hydrogen partial pressure. The fluidization conditions can be controlled so that hydrogen generation via oxidation of the reduced iron oxides with steam can be limited to some zone (Zone A) below the point of introduction of the reduced iron oxides into the fluidized bed. Below this Zone A, a second zone (Zone B) will exist where hydrogen generation via steam oxidation of the reduced iron oxides would be minimal due to depletion of the reduced iron oxides by oxidation with steam. Above Zone A, there will exist a third zone (Zone C) c) where no oxidation of reduced iron oxides will occur, since no reduced iron oxides will be present, Zone C being above the point of introduction. Thus, in Zone B, the formation of carbon oxides via the steam-carbon reaction is favored due to the minimum hydrogen-to-steam ratios present, since the hydrogen in this zone is generated primarily only via the steam-carbon reaction. In Zone A, where hydrogen is also generated via steam oxidation of the reduced iron oxides, the steam-carbon reaction is greatly depressed due to the increased hydrogen-to-steam ratio. This excessive hydrogen generation in Zone A will also lead to generally decreased steam-carbon reaction in Zone C, due to the upwardly flowing nature of the gas in the fluidized bed. Thus, by controlling the relative sizes of Zones A, B, and C, the amounts of carbon oxides generated in the fluidized bed can be controlled. In general, the greater the relative size of Zone B, the greater will be the generation of carbon oxides in the fluidized bed. The generation of methane in the fluidized bed may be either increased or decreased with increases in the relative size of Zone B, even though suppression of the steam-carbon reaction decreases the total amount of hydrogen generation, since the corresponding increases in the relative sizes of Zones A and C increase the contact time of carbonaceous solids with gases having favorable hydrogen partial pressures for methane generation.

Temperatures of operation in the Oxidation Vessel ranging between 1,000 and 2,000 F. are practical, but a preferable temperature range is between 1,300° and 1,800° F. The temperatures are regulated by control of the amount of steam, fed into the Oxidation Vessel.

Pressures that are desirable for the process range from a minimum of 200 p.s.i.g. to 2,000 p.s.i.g. Relatively high pressures result in high hydrogen partial pressures which are beneficial in obtaining more methane from the hydrogen-carbon reaction. A preferable operating range is from 300 p.s.i.g. to about 1,200 p.s.i.g.

The overall consumption of fresh coal in the process is such that the ratio of circulation of the iron to that of the fresh coal fed is about 10:1 by weight.

It has been determined, however, that the rates of reaction for oxidation of the iron are severalfold those of the coal char reactions. Therefore, as the char and iron are circulated, there will be a buildup of char content in the mixture until a steady state is obtained at the particular temperature level maintained in the reactors so that the char consumption reaction rate exactly equals the coal feed rate. For instance, at a suitable typical operating temperature, the steady state composition of the solids may be 50 percent char and 50 percent iron.

Particle sizes of the iron can conveniently be in the range of 10 to 250 mesh and coal particle sizes can be in the same range. Gas velocities through the Oxidation Vessel are a means of control of contact time and range from about 0.3 of a foot per second to about 5 feet per second. In the process of the present invention, the particle size of the carbonaceous solids is selected to permit ready fluidization thereof by the upflowing gases, while at the same time, the particle size of the iron or iron oxides is selected to assure settling of the iron or iron oxide through the fluidized bed of carbonaceous solids countercurrently to the upflowing steam.

An example of operating the process described in this invention is as follows: In a large plant having a capacity of 90,000,000 SCFD of high B.t.u. gas, the circulation rate of iron-iron oxide mixture is about 90,000,000 lbs/day or 3,750,000 lbs/hour or 1,875 tons/hour. This amount of iron generates about 90,000,000 SCFD of hydrogen. To this amount of circulating iron would be added 4,400 tons/day of coal or 183 tons/hour. This coal provides all of the energy required in the plant. Steam fed to the iron oxidation vessels is 410,000 lbs/hour. A typical composition of the raw product gas from the oxidation vessels is shown below.

TABLE

| Raw Product Gas Compostion | |
| --- | --- |
| CO | 13.2% |
| $CO_2$ | 7.6% |
| $H_2$ | 30.1% |
| $H_2O$ | 16.8% |
| $CH_4$ | 30.1% |
| $C_2H_4$ | 1.1% |
| $N_2$ | 0.7% |
| $H_2S$ | 0.4% |
| Total | 100.0% |
| Volume, MM. SCFH | 8.3 |

According to the provisions of the patent statutes, I have explained the principle, preferred construction, and mode of operation of my invention and have illustrated and described what I now consider to represent its best embodiment. However, I desire to have it understood that, within the scope of the appended claims, the invention may be practiced otherwise than as specifically illustrated and described.

I claim:

1. In the process wherein steam is reacted with a mixture of FeO and Fe to make hydrogen and $Fe_3O_4$ in the presence of carbonaceous solids whereby a gas containing methane is produced, the improvement which comprises:
    a. establishing and maintaining a zone of fluidized carbonaceous solids,
    b. flowing a stream of Fe and FeO downwardly through said zone,
    c. flowing a stream upwardly through said zone in countercurrent flow relationship to said stream of Fe and FeO,
    d. maintaining a temperature and a pressure within said zone at which reaction of steam with Fe and FeO to make $Fe_3O_4$ and hydrogen occurs and reaction of carbonaceous solids and hydrogen to make methane also occurs, and e. separately recovering $Fe_3O_4$ and a methane-containing gaseous product from said zone.

2. The method of claim 1 wherein said temperature is maintained between 1,000° and 2,000° F. and said pressure between 200 and 2,000 p.s.i.g.

3. The process according to claim 1 wherein said temperature is maintained between 1,300° and 1,800° F. and said pressure between 300 and 1,200 p.s.i.g.

4. The method according to claim 1 wherein the $Fe_3O_4$ is removed from said zone of carbonaceous solids and reduced to a mixture of Fe and FeO suitable for recycle.

5. The method of claim 1 wherein said carbonaceous solids consist essentially of char obtained by the devolatilization of coal.

* * * * *

PO-1050
(5/69)

UNITED STATES PATENT OFFICE
CERTIFICATE OF CORRECTION

Patent No. 3,615,298      Dated October 26, 1971

Inventor(s)    Homer E Benson

It is certified that error appears in the above-identified patent and that said Letters Patent are hereby corrected as shown below:

| | |
|---|---|
| Column 1, line 4: | "This application is a continuation" should read --This application is a continuation-in-part--; |
| Column 1, lines 9: and 10: | "continuation Ser. No. 598,072" should read --continuation of application Ser. No. 598,072--; |
| Column 2, line 29: | "through conduit 16 form" should read --through conduit 16 from--; |
| Column 2, line 55: | Beginning of Reaction #2 "$H_2O+Feo$" should read --$H_2O+3FeO$--; |
| Column 2, line 55: | H Calorie reading "-11,9000" should read -- -11,900 --; |
| Column 3, line 5: | "Reduction Zone 13" should read --Reduction Zone 12--; |
| Column 3, line 36: | "(Zone C)c)" should read --(Zone C)--; |
| Column 3, line 63: | "2,000 F." should read --2,000°F.--; |
| Column 4, line 70: | (Claim 1) "flowing a stream upwardly" should read --flowing a stream of steam upwardly--. |

Signed and sealed this 11th day of April 1972.

(SEAL)
Attest:

EDWARD M.FLETCHER,JR.
Attesting Officer

ROBERT GOTTSCHALK
Commissioner of Patents